Aug. 15, 1961 R. G. MINER 2,996,082
THREE WAY VALVE
Filed Sept. 8, 1958
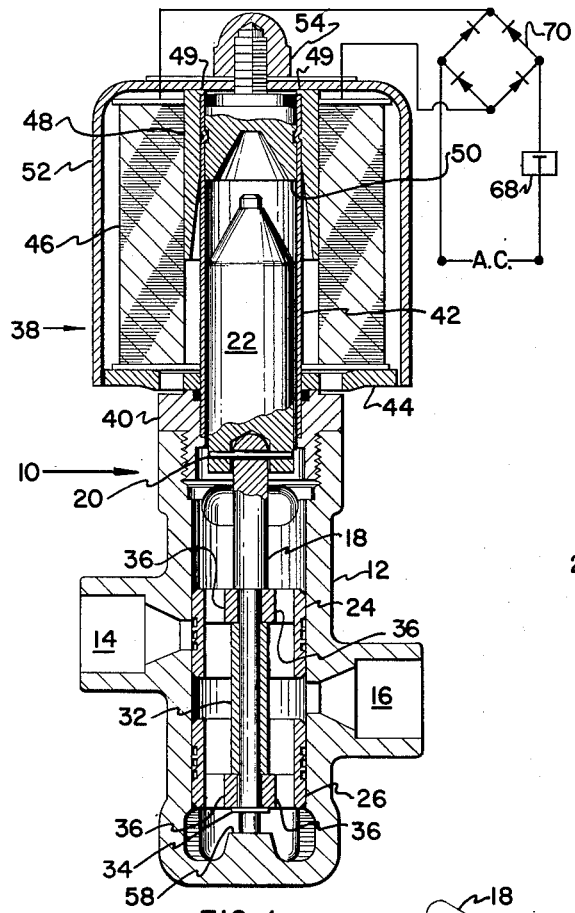
FIG. 1
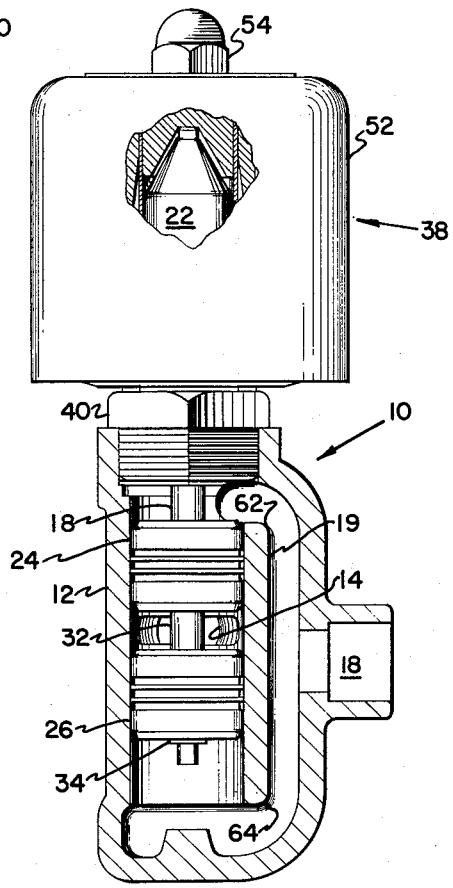
FIG. 2
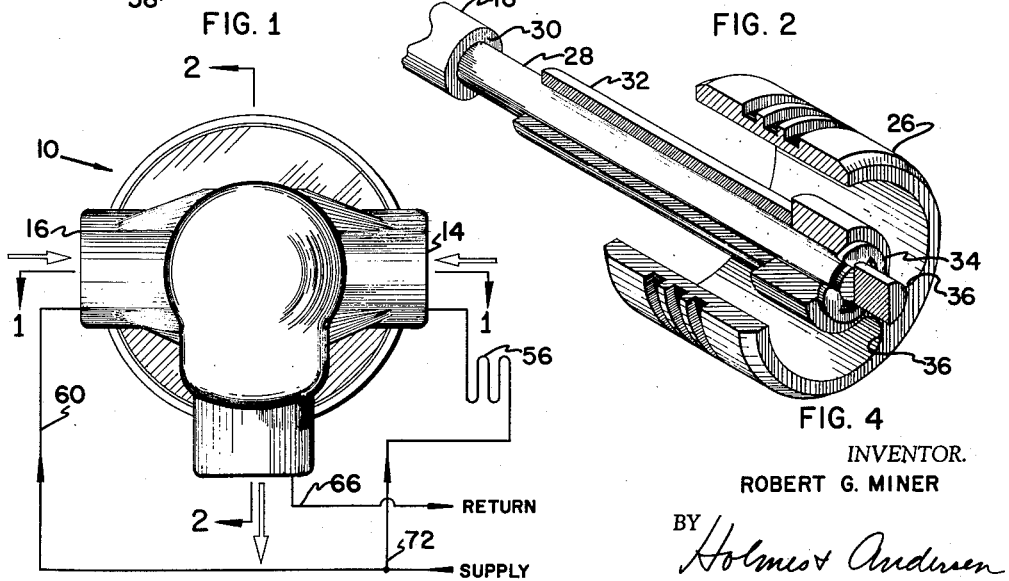
FIG. 3
FIG. 4
INVENTOR.
ROBERT G. MINER
BY Holmes & Andersen
ATTORNEYS 2,996,082
THREE WAY VALVE
Robert G. Miner, La Crosse, Wis., assignor to The Trane Company, La Crosse, Wis., a corporation of Wisconsin
Filed Sept. 8, 1958, Ser. No. 759,774
3 Claims. (Cl. 137—625.4)

This invention relates to a three way valve and more particularly to a balanced three way solenoid actuated water valve.

An object of the present invention is to provide a new and improved balanced three way valve which is inexpensive to manufacture and easy to assemble and repair.

Another object of the invention is to provide a solenoid operated three way valve with a reciprocating piston which is balanced so that only a minimum magnetic force is required to initiate actuation of the valve.

A third object of the invention is to provide a balanced solenoid operated three way valve with piston valve members in which the movable armature and the piston members are self aligning in the piston body so that the components of the valve may be assembled even though the construction of the component parts may vary with manufacturing tolerances.

Still another object of the invention is to provide a new and improved balanced solenoid operated three way water valve which has two perforated piston valve members loosely secured to a plunger rod whereby the component parts may be readily assembled and the assembled valve requires only a slight magnetic force to initiate actuation of same.

Other objects and advantages of the invention will be clearly apparent as the specification proceeds to describe the invention with reference to the accompanying drawings in which:

FIGURE 1 is a section view on line 1—1 of FIGURE 3 showing the position of the valve assembly when the solenoid coil is not energized;

FIGURE 2 is a partial section view on line 2—2 of FIGURE 3 showing the position of the valve assembly when the solenoid coil is energized;

FIGURE 3 is a bittom view of my new and improved three way valve; and

FIGURE 4 is a partial assembly view of the valve assembly showing the manner of connecting the valve components together.

In the normal solenoid operated valve application, the pressure to be overcome by the solenoid in order to move the valve assembly must be small. Otherwise the solenoid will have to be so large that the size and cost would be prohibitive for commercial use. Further, the power requirements would be greatly increased and in a large number of applications such power would not be available. Therefore, solenoid operated three way valves are not normally used on water systems, since necessarily for efficient water circulation, the pressure drop across the system must be comparatively large. For example, in a system operating at 200 p.s.i., a difference of 10 p.s.i. is considered averaged between the alternate inlet ports of the valve. This 10 p.s.i. differential results in a force of approximately 2 pounds on the valve member of a conventional disc type 3 way valve. Since the average solenoid for this type of application can overcome only a force of about one to two ounces, it is obvious that the use of a solenoid operated valve is not practical unless the force is overcome or balanced. Therefore, my foregoing invention provides a solution to a problem which has existed for years in the heating and cooling field in that it provides a practical and economical solenoid operated three way valve which may be used on water systems and at the same time be low enough in cost to be competitive with other types of three way valves.

Referring to the drawing in detail and particularly FIGURE 1, my improved valve 10 is enclosed by a valve body 12 with inlet ports 14 and 16 and outlet port 18 therein. Outlet feed passages 62 and 64 are formed between partition 19 and valve body 12. Slidably supported within the valve body 12 is a valve assembly consisting of plunger 18 pivotally secured by a pin 20 to movable armature 22 and pistons 24 and 26 secured to reduced section 28 of plunger 18. Looking at FIGURES 1 and 4, it can be seen that plunger 18 is reduced in diameter at the lower end and that the closed end of piston 24 abuts against machined surface 30. Piston 26 is separated from piston 24 by rotatable sleeve member 32 and is held in position by spring clip 34. Pistons 24 and 26 are provided with crescent shaped slots 36 for reasons which will be described later.

The solenoid valve actuator 38 consists of a base member 40 screwed or otherwise attached to the valve body 12, a tube 42 welded to the base member 40, a support member 44 surrounding tube 42 and resting on the base member 40, a coil 46 surrounding tube 42, a wedge shaped member 48 between coil 46 and resting on tube 42 by means of lugs 49 in order to complete the magnetic field, head member 50 of magnetic material, and a cover 52 secured to the head member 50 by means of a nut 54 or any other suitable connecting means.

It should be noted that plunger 18 and movable armature 22 are not rigidly supported to one another so that any misalignment of the valve assembly is avoided if valve body 10, base member 40, or tube 42 do not interconnect exactly. In other words, the valve assembly is self-aligning even if the valve members themselves do not fit together exactly in the manner contemplated.

This new and improvel valve assembly may be used in numerous applications but only the preferred application is schematically illustrated. Looking at FIGURE 3, the valve is shown in use with a heating or cooling coil 56 with the valve controlling the flow of cold water in the summer or hot water in the winter.

It is obvious that my disclosed valve may be used in other than water systems. For example, my valve may be used in high pressure hydraulic systems.

Operation

When the valve member is in the position shown in FIGURE 1 with the end of plunger 18 abutting the stop 58, the heat exchange fluid passes through line 60 to inlet 16, through inlet 16 into valve body 12, upwardly and downwardly through slots 36 in pistons 24 and 26, through passages 62 and 64 to outlet 18, and into return line 66. This valve position is maintained so that the heat exchange coil 56 is by-passed so long as thermostat 68 is satisfied by the temperature of the enclosure being heated or cooled by the air passing over heat exchange coil 56.

When the thermostat 68 calls for heating or cooling, alternating current is fed to rectifier 70 and from rectifier 70 D.C. current is supplied to solenoid coil 46. When solenoid coil 46 is energized, movable armature moves to the position shown in FIGURE 2. Heat exchange fluid then flows through line 72 to coil 56, through coil 56 to inlet 14, through inlet 14 into valve body 12, upwardly and downwardly through slots 36 in pistons 24 and 26, to passages 62 and 64, and through passages 62 and 64 into return line 66. This position of the valve is maintained as long as thermostat 68 is calling for a change in temperature in the area to be modified.

As previously discussed, normally, solenoid operated three way valves are not used on fluid systems due to the water pressure on the valve member which cannot be overcome by the solenoid. Obviously, I have provided a solenoid operated three way valve which is balanced so that only a minimum force is required to overcome the force on the valve members. This is accomplished by the provision of two identical piston members between which the fluid is introduced. The flow splits and travels in the upward and downward direction through the slots in both pistons. Therefore, since the two pistons are identical, the pressure drop across one piston will be the same as the pressure drop across the other piston which results in a balanced valve since the forces in both directions are equal. Looking at FIGURE 1, it can readily be seen that the forces on the inner and outer surfaces of piston 24 are equal respectively to the forces on the inner and outer surfaces of piston 26.

In conclusion, I have provided a new and novel valve construction which allows the use of a solenoid coil as an actuator. Further, my valve construction is self-aligning thereby providing economy of manufacture and freedom from in operativeness due to errors in construction. Also, the use of a D.C. solenoid coil insures quiet operation.

Although I have described in detail the preferred embodiment of my invention, I contemplate that many changes may be made without departing from the scope or spirit of my invention, and I desire to be limited only by the scope of the claims.

I claim:

1. A solenoid operated three way water valve comprising; a vertically elongated hollow valve body, a solenoid supported on top of said valve body, a hollow tube member supported within said solenoid and communicating with the interior of said valve body, means forming a first inlet port and a second inlet port on opposite sides of said valve body, said inlet ports being displaced from one another a predetermined distance in the vertical direction of the valve body, means forming an outlet port from said valve body between said first and second inlet ports, partition means extending across said valve body separating said first and second inlet ports from said outlet port, means forming passages in the top and bottom of said partition to provide communication between said inlet and said outlet ports, an armature slidably mounted in said tube, a plunger rod in said valve body and pivotally secured to said armature, a pair of open end pistons rotatably attached and slidable with said plunger rod, and spacing means between said pistons spacing said pistons so that the uppermost of said pistons blocks said first inlet port and said other piston is located below said second inlet port whereby the magnetic force required by said solenoid to move said pistons upwardly to close said second inlet port and open said first inlet port to pass fluid from said first inlet port to said outlet port is at a minimum.

2. A solenoid operated three way water valve comprising; a hollow valve body, a solenoid operably connected to said valve body, means forming a first inlet port and a second inlet port in said valve body, means forming an outlet port in said valve body, partition means extending across said valve body separating said first and second inlet ports from said outlet port, passage means in said partition means to provide communication between said inlet ports and said outlet port, said passage means comprising passages in the top and bottom of said partition means, a movable armature in said solenoid, a plunger rod operably connected to said armature and located substantially within said valve body, a pair of open end pistons connected to said plunger rod, means positioning one of said pistons to stop the flow from said first inlet port when said solenoid is energized and to position said other piston to stop the flow from said second inlet port when said solenoid is de-energized.

3. A solenoid operated three way water valve comprising; a vertically elongated hollow valve body, a solenoid operably connected to said valve body, means forming a first inlet port and a second inlet port in said valve body, means forming an outlet port in said valve body, partition means extending across said valve body separating said first and said second inlet ports from said outlet port, passage means in said partition means to provide communication between said inlet ports and said outlet port, said passage means comprising openings in said partition means above said second inlet port and below said first inlet port, a movable armature in said solenoid, a plunger rod operably connected to said armature and located substantially within said valve body, a pair of open end pistons connected to said plunger rod, one of said pistons blocking the flow of fluid from said first inlet port, and the other of said pistons being located below said second inlet port whereby the magnetic force required by said solenoid to move said pistons upwardly to close said second inlet port and open said first inlet port to pass fluid from said first inlet port to said outlet port is at a minimum.

References Cited in the file of this patent

UNITED STATES PATENTS

| | | |
|---|---|---|
| 773,541 | Bunting | Nov. 1, 1904 |
| 1,132,203 | Matthews | Mar. 16, 1915 |
| 1,765,090 | Morin | June 17, 1930 |
| 2,307,585 | Harrington | Jan. 5, 1943 |
| 2,404,349 | Brant | July 23, 1946 |
| 2,638,122 | Ludwig | May 12, 1953 |
| 2,698,030 | Lehner | Dec. 28, 1954 |
| 2,723,681 | MacGlashan | Nov. 15, 1955 |
| 2,826,215 | Wolfslau | Mar. 11, 1958 |
| 2,893,428 | Collins | July 7, 1959 |